United States Patent
Perez Pineiro et al.

(10) Patent No.: US 12,460,123 B2
(45) Date of Patent: Nov. 4, 2025

(54) SULFONYL AZIDE COMPOSITION FOR SULFUR SCAVENGING IN OILFIELD OPERATIONS

(71) Applicant: Cameron International Corporation, Houston, TX (US)

(72) Inventors: Rolando Perez Pineiro, Nisku (CA); Alyn Jenkins, Aberdeen (GB); Jody Hoshowski, Nisku (CA); Adnan Alhammoud, Nisku (CA)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

(21) Appl. No.: 19/119,792

(22) PCT Filed: Oct. 23, 2023

(86) PCT No.: PCT/US2023/035725
§ 371 (c)(1),
(2) Date: Apr. 10, 2025

(87) PCT Pub. No.: WO2024/091459
PCT Pub. Date: May 2, 2024

(65) Prior Publication Data
US 2025/0263596 A1    Aug. 21, 2025

Related U.S. Application Data

(60) Provisional application No. 63/380,646, filed on Oct. 24, 2022.

(51) Int. Cl.
*C09K 8/532* (2006.01)

(52) U.S. Cl.
CPC .......... *C09K 8/532* (2013.01); *C09K 2208/20* (2013.01)

(58) Field of Classification Search
CPC ............................. C09K 8/532; C09K 2208/20
See application file for complete search history.

(56) References Cited

U.S. PATENT DOCUMENTS

2012/0012506 A1    1/2012    Compton et al.

FOREIGN PATENT DOCUMENTS

KR    20130047738    5/2013

OTHER PUBLICATIONS

Yang (Yang, C. T. et al., "Data-driven identification of hydrogen sulfide scavengers", Angewandte chemie international edition, 2019, vol. 58, pp. 10898-10902).*
Miyazaki (Miyazaki, Y. et al., "A sulfonyl azide-based sulfide scavenger rescues mice from lethal hydrogen sulfide intoxication", Toxicological sciences, 2021, vol. 183, pp. 393-403).*
Katkov (Katkov, A. L., et al., "Removing sulfur compounds from hydrocarbon gases with sorbents based on iron-manganese composites", 2009, Chemistry and technology of fuels and oils, vol. 45, pp. 134-137).*
Raushel (Raushel, J. et al., "Efficient synthesis of sulfonyl azides from sulfonamides", Organic letters, 2008, vol. 10, pp. 3385-3388).*
International Search Report and Written Opinion of International Patent Application No. PCT/US2023/035725 dated on Feb. 20, 2024, 09 pages.
Yang, C. T. et al., "Data—Driven Identification Of Hydrogen Sulfide Scavengers", Angewandte Chemie International Edition, 2019, 58(32), pp. 10898-10902.
Miyazaki, Y. et al., "A Sulfonyl Azide-Based Sulfide Scavenger Rescues Mice From Lethal Hydrogen Sulfide Intoxication", Toxicological sciences, 2021, 183(02), pp. 393-403, Oxford Academic.
Katkov, A. L., et al., "Removing Sulfur Compounds From Hydrocarbon Gases With Sorbents Based On Iron-Manganese Composites", Chemistry and technology of fuels and oils, 2009, vol. 45, pp. 134-137.
Raushel, J. et al., "Efficient synthesis of sulfonyl azides from sulfonamides", Organic letters, 2008, 10(16), pp. 3385-3388, ACS Publications.
Henthorn, H.A. et al., "Mechanistic Insights Into The H2S-Mediated Reduction Of Aryl Azides Commonly Used In H2S Detection", Journal of the American Chemical Society, 2015, 137(48), pp. 15330-15336.

* cited by examiner

*Primary Examiner* — Kumar R Bhushan
(74) *Attorney, Agent, or Firm* — Jeffrey D. Frantz

(57) ABSTRACT

Methods described herein use benzene sulfonyl azide molecules as scavengers of sulfur species, including $H_2S$, mercaptans, or both in industrial processes such as hydrocarbon production.

10 Claims, 2 Drawing Sheets

SULFONYL AZIDE COMPOSITION FOR SULFUR SCAVENGING IN OILFIELD OPERATIONS

CROSS-REFERENCE PARAGRAPH

This application is the National Stage Entry of International Application No. PCT/US2023/035725, filed Oct. 23, 2023, which claims the benefit of U.S. Provisional Application No. 63/380,646 entitled "Sulfonyl Azides Composition for Sulfide Scavenging in Oilfield Operations," filed Oct. 24, 2022, the disclosure of which is incorporated herein by reference in its entirety.

FIELD

This patent application relates to management of sulfur species such as sulfides and mercaptans in materials encountered in oilfield operations. Specifically, this application is related to the use of sulfonyl azide compositions for sulfur scavenging in oilfield operations.

BACKGROUND

Hydrogen sulfide ($H_2S$) is a toxic chemical that is often found in hydrocarbon deposits. Because of the toxicity, $H_2S$ must be removed from hydrocarbon materials before they can be used. Mercaptans are sulfur-containing species that typically have unacceptable odors. Methods are generally employed to control and prevent any release of such materials. Chemical scavengers are conventionally used to remove sulfur species and new chemical scavengers for sulfur species are always sought.

SUMMARY

Embodiments described herein provide a method, comprising adding a benzene sulfonyl azide to a target material comprising hydrocarbon and sulfur species comprising $H_2S$, mercaptans, or both; and reacting the benzene sulfonyl azide with the sulfur species to remove at least a portion of the sulfur species from the target material.

DETAILED DESCRIPTION

Figure 1:
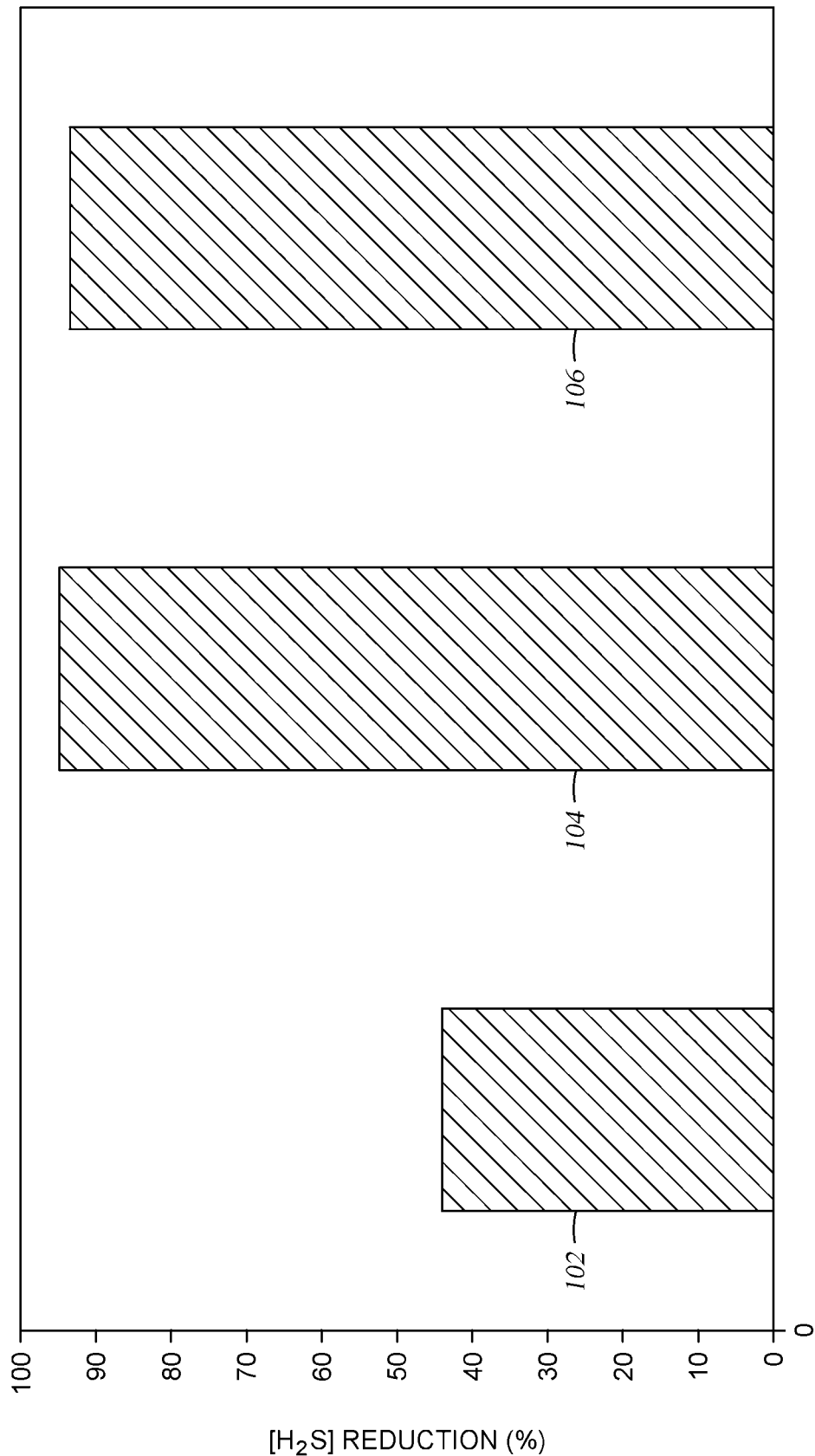
FIG. 1 is a bar graph showing $H_2S$ scavenging of different materials, including some embodiments described herein and one comparative example.

Sulfonyl azides have been proposed as $H_2S$ scavengers in biological systems. Use of such compositions as sulfide and/or mercaptan scavengers in oilfield operations is described herein. In one embodiment, 4-acetamidobenzenesulfonyl azide is demonstrated as a scavenger for mercaptan and/or sulfide species in an industrial simulated environment.

In general, benzene sulfonyl azides of the following formula

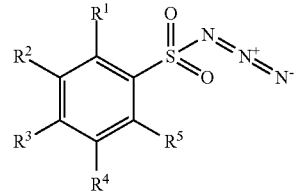

can be used as scavengers of sulfur species in industrial applications such as hydrocarbon production and processing. In formula 1, $R^1$-$R^5$ are, individually and independently, organic or hetero-organic substituents, or hydrogen. $R^1$-$R^5$ can each be, independently, hydrogen or a lower aliphatic alkyl, alkenyl, alkanol, aminoalkyl, or alkanolamine group having 1-5 carbon atoms. $R^2$-$R^4$ can each be, independently, be hydrogen or a linear, branched, cyclic, or bicyclic aliphatic or aromatic group having 1-10 carbon atoms, and can include hetero-atoms such as oxygen and nitrogen. For example, $R^2$-$R^4$ can each, independently, be an alkyl, alkenyl, diene, alkanol, aminoalkyl (monoamine, diamine, triamine, or polyamine), amido, carboxylic acid (carboxylate), aldehyde, acetal, acid anhydride, amino acid, ketone, benzyl, phenol, or phenylamino group, or combination thereof. $R^3$ can be any of the above types of substituents, and can be complex combinations of functionality types and hetero-atom moieties. For example, $R^3$ can be a thiadiazolium, a triazolium, a benzothiazolium, a pyridinium, a pyrimidinium, a barbiturate, a thiobarbiturate, or a dendrimer group. Substituent positions ortho to the sulfonyl azide substituent are more limited in the kinds of substituents that can be used due to proximity to the sulfonyl group, so $R^1$ and $R^5$ are each a substituent group having molecular weight of about 50 or less, $R^2$ and $R^4$ are each a substituent group having molecular weight of about 200 or less, and $R^3$ is not reasonably limited in size.

The benzene sulfonyl azide scavengers herein may be oil soluble, water soluble, or at least somewhat soluble in both oil and water. For use in the hydrocarbon context, some hydrocarbon streams may include volumes of water. In such cases, if only the oil phase is to be treated for removal of sulfur species, a benzene sulfonyl azide that is oil soluble, for example a benzene sulfonyl azide having alkyl substituents, such as a 4-alkylbenzenesulfonylamide, to promote lipophilicity, can be used. If such species are also to be removed from the water phase, a benzene sulfonyl azide scavenger having some solubility in water, for example having one or more substituents that promote hydrophilicity such as hydroxyl groups or carboxylic acid groups, can be used. Substituent groups can be used that promote dissolution of the scavenger in both phases. Different scavenger molecules having different solubilities can also be used in a single composition to provide oil functionality and water functionality.

The benzene sulfonyl azide scavengers herein can be mixed with other scavengers of sulfur species, such as triazines, zinc compounds, and amines. A mixture of a benzene sulfonyl azide and a triazine having the general structure

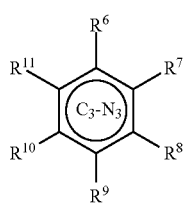

where the structure is a six-member cyclic molecule with a ring structure having 3 nitrogen atoms and three carbon atoms. The triazine can be a 1,2,3-triazine, a 1,2,4-triazine, a 1,3,5-triazine, or a combination thereof. Substituents $R^6$-$R^{11}$ can each be any organic or hetero-organic group, and the groups can be selected for solubility in a target medium and compatibility with benzene sulfonyl azides generally or with a particular benzene sulfonyl azide to be used in a scavenger mixture. For example, where oil solubility is desired, the benzene sulfonyl azide can have alkyl substituents and a triazine having alkyl substituents can be used with the benzene sulfonyl azide.

Other scavengers, such as amines, can be used with the benzene sulfonyl azides herein, as described below, and with selected triazines in mixtures with a benzene sulfonyl azide. Mixtures of different benzene sulfonyl azides can also be used as scavenger mixtures. Any of these materials can be dispersed or dissolved in suitable solvents to ease deployment into a target fluid containing sulfides.

The benzene sulfonyl azide sulfide scavengers described herein are dispersed or dissolved in a medium to facilitate addition to a target material. The target material is typically a stream of material that comprises a mixture of hydrocarbon materials impurities and water emerging from a well formed in the earth. The scavenger materials and the medium constitute a scavenging composition that is added to the target material at a convenient location away from the wellhead where the target material emerges from the earth. The composition can be added directly to a pipe in which the target material is flowing, or a vessel can be provided for accepting the target material and for contacting the target material with the mercaptan scavenging material.

The medium is typically a material that is miscible with the hydrocarbon component of the target material. The medium may also be able to dissolve the benzene sulfonyl azide scavenger. Materials that can dissolve at least some of the scavengers herein and are miscible with typical hydrocarbon materials include aromatic solvents such as benzene, toluene, xylene, naphthalene or derivatives thereof. In some cases, the scavengers described herein can be used without a dispersion medium where the scavenger can be flowed or added directly into a produced stream. In some cases, a medium can be used to disperse the scavengers described herein without dissolving them. Such a medium could be a hydrocarbon-miscible material, such as a hydrocarbon solvent, that does not dissolve the scavenger but can form a dispersion of the scavenger, such as a colloid or slurry. Upon adding such a material to the target material, the solvent blends with, and dissolves into the hydrocarbon component of the target material, and components of the target material can then dissolve the scavenger materials to facilitate the scavenging reaction of the benzene sulfonyl azides in the target material.

The benzene sulfonyl azide scavengers described herein can be added as a solution using a solvent. The solvent can be any solvent generally compatible with the medium to which the scavenger is to be added. The solvent can be an oil-compatible solvent, for example an organic solvent, a water-compatible solvent, or a solvent that distributes between two materials such as oil and water. The solvent, in some cases, can also have sulfide scavenging properties. Alcohol, amine, and ether solvents, and solvents combining such functionalities, can be used. For example, in some cases, materials such as glycol ethers and primary amines can be used as solvents and/or co-scavengers.

To assess $H_2S$ scavenging by a benzene sulfonyl azide in a hydrocarbon application, a hydrocarbon environment was simulated using a 50-50 mixture, by volume, of kerosene and water. The performance of 4-acetamidobenzenesulfonyl azide ("4-ABSA") as an $H_2S$ scavenger in the kerosene-water mixture was evaluated and compared with a commercial sulfide scavenger. All the tests were performed using a 20 wt % solution of 4-ABSA in ethylene glycol monobutyl ether ("EGMBE"). The molecule 4-ABSA has the following structure:

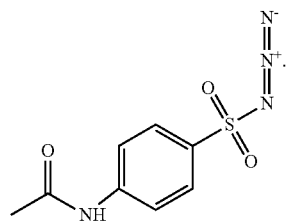

Thus, the molecule 4-ABSA is an example of formula 1 where $R^1$, $R^2$, $R^4$, and $R^5$ are all hydrogen and where $R^3$ is an amido group, specifically an acetamido group. As described above, such substituents can be tailored to provide useful properties such as solubility in oil and/or water. In the amido example above, the alkyl chain of the amido group could be longer, for example 2, 3, 4, or more methylene units, which could be linear or branched to any degree since the substituent is in the para position, to provide incrementally more lipophilicity for the scavenger molecule.

To perform each test, a mixture of 80 mL tap water and 80 mL kerosene, simulating a hydrocarbon stream that might be encountered in an industrial setting, is transferred to a 250 mL gas washing bottle fitted with a side injection port and a tapered stopper with an integrated central vertical tube with a frit at the lower end for gas in and a sidearm for gas out which is connected to a GC to monitor $H_2S$ concentration. The solution is gently stirred at room temperature using a magnetic bar whereas a constant stream of 1.5% $H_2S$, $N_2$ balanced, gas is bubbled through at 70 mL/min until a steady-state is reached. Next, 2 mL of chemical is injected and the $H_2S$ concentration is monitored via GC. The reduction of the $H_2S$ concentration expressed as a percentage is calculated according to the equation:

Reduction $[H_2S]$=(($[H_2S]$ before injection−$[H_2S]$ after injection)*100)/$[H_2S]$ before injection $H_2S$ uptake proceeds with time as the scavenger reacts with $H_2S$ in the solution. To ascertain the $H_2S$ uptake capacity of the scavenger, a time-dependent curve or time-series of $H_2S$ uptake is obtained. $H_2S$ uptake capacity is calculated by integrating the area below the curve obtained after the chemical injection and it is expressed as liters of scavengers per kg of $H_2S$.

Preliminary results allowed us to assess the impact of the different scavenger mixtures in the reduction of the $H_2S$ concentration after injection. FIG. 1 is a bar graph showing $H_2S$ scavenging of different materials. At 102, a first bar shows the H₂S uptake of a solution of 20 wt % 4-ABSA in EGMBE. At 104, a second bar shows the H₂S uptake of a solution of 20 wt % 4-ABSA and 5 wt % hexylamine ("HEA") in EGMBE. At 106, a third bar shows the H₂S uptake of a commercial H₂S scavenger, HR-21730, for comparison. The sulfonyl azide alone showed 44% H₂S reduction in the water-kerosene solution when tested without a base. In the presence of 2 wt % hexylamine (HEA) the scavenger efficiency of the compound is significantly increased up to 95%. While not wishing to be limited by theory, it is believed that the addition of a small amount of base favors formation of the nucleophile bisulfide (HS—) which subsequently reacts with the terminal azide nitrogen to form an anionic azidothiol. Next, this intermediate is believed to be attacked by a second bisulfide ion to generate the corresponding sulfonamide and elemental sulfur as reaction byproducts. The 4-ABSA/HEA mixture shows an H₂S scavenger activity similar to HR-21730 which contains comparable amounts of MMA Triazine as the active component.

Figure 2:
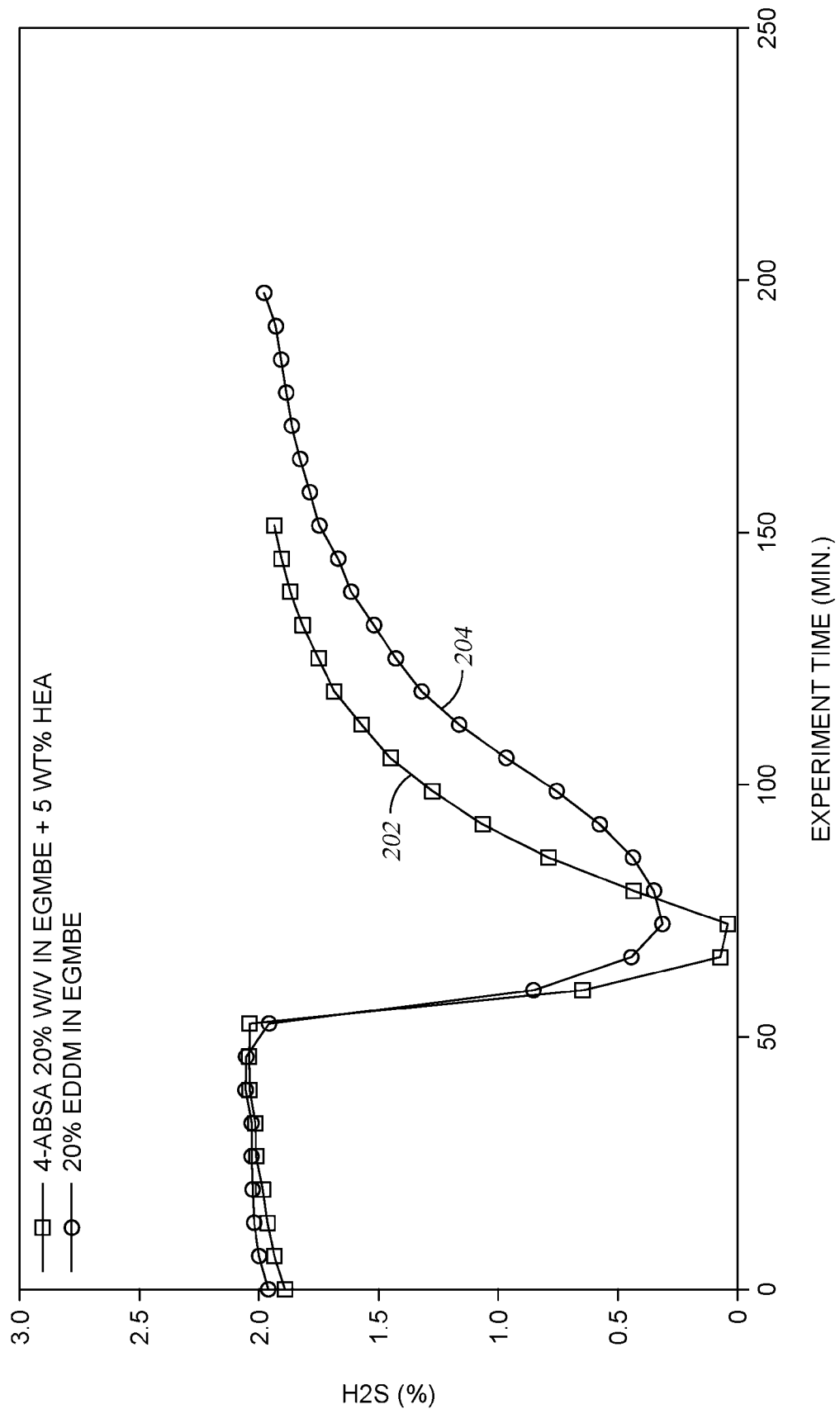
FIG. 2 is a graph showing $H_2S$ uptake as a function of time for materials that are embodiments of the technology described below.

In other results, the H₂S uptake capacity of 4-ABSA/HEA (38 L/Kg H₂S) was comparable to that obtained for a 20% solution of the commercial EDDM scavenger in EGMBE (35 L/Kg H₂S). FIG. 2 is a graph showing H₂S uptake as a function of time for the ABSA/HEA solution, at 202, and the commercial EDDM solution, at 204. These results indicate that benzene sulfonyl azide molecules can be used as H₂S scavengers with similar performance to that of current commercial H₂S scavengers. It is expected that the H₂S scavenging properties of molecules like 4-ABSA, benzene sulfonyl azide molecules, is also effective for reacting with and removing mercaptans.

The benzene sulfonyl azide molecules described herein can be obtained commercially, in some cases. For example, the 4-ABSA molecule described above is available commercially. The molecule 4-dodecylbenzenesulfonyl azide, in which $R^3$ is a dodecyl group, is also available commercially. Other benzene sulfonyl azide molecules can be synthesized by known methods. For example, benzene sulfonic acids can be converted to benzene sulfonyl azides by reaction with sodium azide in the presence of triphenylphosphine and trichloroisocyanuric acid according to known methods.

The preceding description has been presented with reference to present embodiments. Persons skilled in the art and technology to which this disclosure pertains will appreciate that alterations and changes in the described structures and methods of operation can be practiced without meaningfully departing from the principle, and scope of this present disclosure. Accordingly, the foregoing description should not be read as pertaining only to the precise structures described and shown in the accompanying drawings, but rather should be read as consistent with and as support for the following claims, which are to have their fullest and fairest scope.

The invention claimed is:

1. A method, comprising:
    adding a benzene sulfonyl azide having the general structure

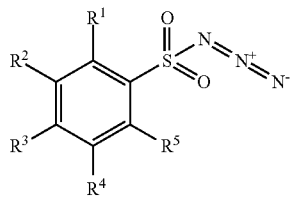

to a target material comprising hydrocarbon and sulfur species comprising H₂S, mercaptans, or both, wherein $R^1$ and $R^5$ are each, independently, hydrogen or a lower aliphatic alkyl, alkenyl, alkanol, aminoalkyl, or alkanolamine group having 1-5 carbon atoms, and $R^2$-$R^4$ are each independently, hydrogen or a linear, branched, cyclic, or bicyclic aliphatic or aromatic group having 1-10 carbon atoms, and can include hetero-atoms such as oxygen and nitrogen; and
    reacting the benzene sulfonyl azide with the sulfur species to remove at least a portion of the sulfur species from the target material,
    wherein the benzene sulfonyl azide comprises 4-acetamidobenzenesulfonyl azide.

2. The method of claim 1, wherein benzene sulfonyl azide is an alkylbenzene sulfonyl azide.

3. The method of claim 1, wherein $R^2$-$R^4$ can each, independently, be an alkyl, alkenyl, diene, alkanol, aminoalkyl (monoamine, diamine, triamine, or polyamine), amido, carboxylic acid (carboxylate), aldehyde, acetal, acid anhydride, amino acid, ketone, benzyl, phenol, or phenylamino group, or combination thereof.

4. The method of claim 1, wherein $R^3$ is a thiadiazolium, a triazolium, a benzothiazolium, a pyridinium, a pyrimidinium, a barbiturate, a thiobarbiturate, or a dendrimer group.

5. The method of claim 1, wherein $R^1$ and $R^5$ are each a substituent group having molecular weight of about 50 or less, $R^2$ and $R^4$ are each a substituent group having molecular weight of about 200 or less.

6. The method of claim 1, wherein the benzene sulfonyl azide is soluble in oil.

7. The method of claim 1, wherein the benzene sulfonyl azide is a component of a scavenger mixture comprising a triazine or amine sulfide scavenger.

8. The method of claim 1, wherein the benzene sulfonyl azide is added as a solution in an organic solvent.

9. A method, comprising:
    adding 4-acetamidobenzenesulfonyl azide to a target material comprising hydrocarbon and sulfur species comprising H₂S, mercaptans, or both; and
    reacting the 4-acetamidobenzenesulfonyl azide with the sulfur species to remove at least a portion of the sulfur species from the target material.

10. The method of claim 9, wherein the 4-acetamidobenzenesulfonyl azide is added as a solution in an organic solvent.

* * * * *